UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

BLEACHING SOLUTIONS CONTAINING TITANOUS CHLORID AND METHOD OF PRODUCING THE SAME.

1,105,308.     Specification of Letters Patent.     Patented July 28, 1914.

No Drawing.     Application filed April 18, 1912. Serial No. 691,740.

*To all whom it may concern:*

Be it known that I, AUGUSTE J. ROSSI, a citizen of the United States, and a resident of Niagara Falls, in the county of Niagara and State of New York, have invented certain new and useful Bleaching Solutions Containing Titanous Chlorid and a Method of Producing the Same, of which the following is a specification.

My present invention relates particularly to the production of solutions for use in bleaching, or discharging color from, animal matters, such for example as silk or its fabrics, wool, leather, etc.

I believe that heretofore compounds of chlorin have remained unutilized in bleaching animal matter because of the hitherto recognized injurious effects of free chlorin in the solutions on the tissues of other than substances of vegetable origin, resulting in deteriorations, evidenced by the destruction, or diminution, of their luster, or impairment of other conventionally required characteristics of bleached products.

I am aware that the efficacy of titanous chlorid has been suggested to discharge colors already produced on fabrics, but this without disclosing its effectiveness, discovered by me, for that purpose, and for bleaching generally, when applied to articles of animal origin as distinguished from cotton goods or other vegetable substances.

The object of my present invention is the production of solutions containing, or consisting principally of, titanous chlorid $Ti_2Cl_6$ or $TiCl_3$ adapted to successful bleaching thereby of the most delicate animal-derived substances of all forms and by procedures so economical, rapid and effective as to justify their manufacture and usage on industrial scales.

It has hitherto been assumed, as described by E. Glatzell, that a solution of titanous chlorid derived from metallic, *i. e.* elemental, titanium with hydrochloric acid could not be evaporated without decomposition, resulting in prohibitory losses of titanic content through deposition of finely divided titanic acid, in consequence of which it has been attempted to produce the desired titanium sesquichlorid by dissolving orthotitanic-hydrate in hydrochloric acid with resulting titanic chlorid ($TiCl_4$) and subjecting latter to electrolysis under specified conditions, as witness Letters Patent of the United States to H. Spence, No. 723,217, dated March 17, 1903. I have however discovered that such too-costly, if not prohibitorily expensive, procedures may be dispensed with, and the sesquichlorid of titanium, in form and environment available for bleaching, simply produced, by dissolving an alloy of iron and titanium in dilute hydrochloric acid, filtering the resulting solution to remove therefrom silica and other impurities undesirable in bleaching, and then, if desired, evaporating it to any desired condensation, whereby, proportionately to evaporation, its chlorids of iron are, I have discovered, crystallized and thus readily separated from the final product. I have also discovered that the titanous chlorid thus produced, in presence of iron and ferrous chlorid, does not prohibitively, if at all, suffer losses through the above referred to formation or deposits of titanic acid to be expected when metallic titanium is so dissolved in absence of such ferrous agents; also that it is, by reason of their presence, substantially devoid of free chlorin and exceptionally stable as compared with previous solutions containing compounds of chlorin; also that, as above noted, the evaporation of the solution comprising chlorid of iron and said chlorid of titanium results proportionately in crystallization of the chlorid of iron whereby the latter, though not detrimental in the bleaching of some substances and colors, may be separated to almost any desired extent, if undesirable for any special purpose.

I produce my novel solutions, containing titanous chlorid, as follows:—I dissolve, in any suitable vessel, the alloy of iron and titanium known as ferro-titanium by dilute hydrochloric acid, preferably diluted in its own weight of water. So important is the presence of the iron that I prefer to employ ferro-titaniums in which the titanium content does not exceed say 50 per cent. and have attained excellent results with ferro-titaniums in which the titanium content did not exceed 20 per cent.

My numerous experiments have demonstrated that the rapidity and effectiveness of the reactions is substantially proportional to the preponderance of iron in the alloy, which may be attributed to the speed with which iron, as compared to titanium, decomposes water, thus raising the temperature of the charge while producing violent disengagement of gas which appears to favor and accelerate the reactions between the titanium and the chlorin. The resulting solution should consist, besides water, of ferrous chlorid, titanous chlorid and such excess of hydrochloric acid as may remain after completion of the reactions. The solution is also notably characterized by its freedom from free chlorin, and its purple violet color. I am confident that the said absence of free chlorin, which constitutes one of the most desirable qualities of my solutions in their applications to substances of animal origin, on which the destructive action of that agent must be admitted, is attributable principally, if not entirely, to the presence of the ferrous chlorid which in proportion as chlorin may for any cause be liberated, as by formation of titanium oxid for example, combines immediately therewith to form ferric chlorid thus exempting the animal substances treated from access by free chlorin except to the extent to which latter may react with their coloring matters. The resulting solution must then be filtered, in any convenient manner, so as to separate therefrom its impurities undesirable in bleaching, such for example as may have been contributed by the ferro-titanium, i. e. silica, carbon, etc. My said solution is, at this stage in its production, ill adapted for many industrial applications thereof owing to its, in many instances, prohibitory diluteness and bulk; also, in some instances, to excess of its residual hydrochloric acid; and also, more often, to presence in unnecessarily large proportion of ferrous chlorid when the solution is derived from ferro-titanium comparatively low in titanium content. My effort has therefore been to better the solution in such respects. My experiments to this end have resulted in my discovery that undesired excess of ferrous chlorid is readily removable by evaporation, which results, in porportionate crystallization of the ferrous chlorid, which thus becomes readily separable from the liquid to proportionally diminish its ferrous chlorid, the titanous chlorid remaining meanwhile unaffected in solution. I have also discovered that such betterments are best attained by evaporation below 212 degrees Fahrenheit under reduced atmospheric pressure, as in any convenient apparatus for the purpose, for instance an ordinary vacuum pan. This procedure not only accelerates the evaporation but is particularly important in guarding against some undesired comparatively small losses of titanic material which might result from unduly high temperatures under normal atmospheric pressure. It will be moreover noted that the aforesaid evaporation results also in separation from the solution of the excess of hydrochloric acid referred to, which may be saved in any convenient manner for subsequent use. The point is tnat the combined presence of the ferrous chlorid and the conduct of the evaporation below boiling temperature at sub-normal pressure appear to co-act to prevent substantially any diminution of titanous chlorid as by formation of titanic oxid or otherwise.

By the foregoing procedures I have, up to this time, been able to attain and retain in the solution if desired a proportion of titanous chlorid representing over 90 per cent. of the titanium content in the alloy. I have thus reduced the bulk of the original solution to one-twentieth of its original volume without appreciable loss of titanous chlorid, and without depriving it too greatly of ferrous chlorid. The solution thus condensed and conveniently relieved of unnecessary ferrous chlorid is sufficiently concentrated for all practical industrial purposes of transportation or use and may be readily rediluted by water to meet requirements.

My solution concentrated to the extent above described as from the particular ferrotitanium mentioned, i. e. of 20 per cent. titanium content, showed by analysis titanous chlorid in proportion to ferrous chlorid in the ratio of 24 of the former to 17 of the latter, but this ratio might be diminished as regards the ferrous chlorid by continuing the evaporation to the extent desired.

What I claim as new and desire to secure by Letters Patent is the following, viz:—

1. The method of producing bleaching solutions which comprises dissolving in dilute hydrochloric acid an alloy of iron, and titanium containing less than fifty per cent. of titanium, evaporating the resulting solution at temperature below 212 degrees Fahrenheit under reduced atmospheric pressure, therefrom separating resulting crystals of chlorid of iron until titanous chlorid exceeds ferrous chlorid present in said solution, and finally filtering the resulting product to extract therefrom substances undesirable in bleaching solutions.

2. The method of producing bleaching solutions which comprises dissolving in dilute hydrochloric acid an alloy of iron and titanium containing less than fifty per cent. of titanium, evaporating the resulting solution, therefrom separating resulting crystals of chlorid of iron until titanous chlorid exceeds ferrous chlorid present in said solution, and finally filtering the resulting product to extract therefrom substances undesirable in bleaching solutions.

3. A bleaching solution characterized as containing titanous chlorid and less ferrous chlorid, and as being substantially free from free chlorin or hydrochloric acid.

4. The method of producing bleaching solutions which comprises dissolving titanium, and more iron than titanium, in dilute hydrochloric acid, evaporating the resulting solution, and therefrom separating resulting crystals of chlorid of iron until titanous chlorid exceeds ferrous chlorid present in said solution.

5. The method of producing bleaching solutions which comprises dissolving titanium, and more iron than titanium, in hydrochloric acid, evaporating the resulting solution, and therefrom separating resulting crystals of chlorid of iron until titanous chlorid exceeds ferrous chlorid present in said solution.

AUGUSTE J. ROSSI.

Witnesses:
WALTER D. EDMONDS,
PHILIP C. PECK.